M. G. DONK.
PROCESS FOR PRODUCING HIGH GRADE ROSIN FROM LOW GRADE ROSIN.
APPLICATION FILED APR. 1, 1915.
1,219,413. Patented Mar. 13, 1917.
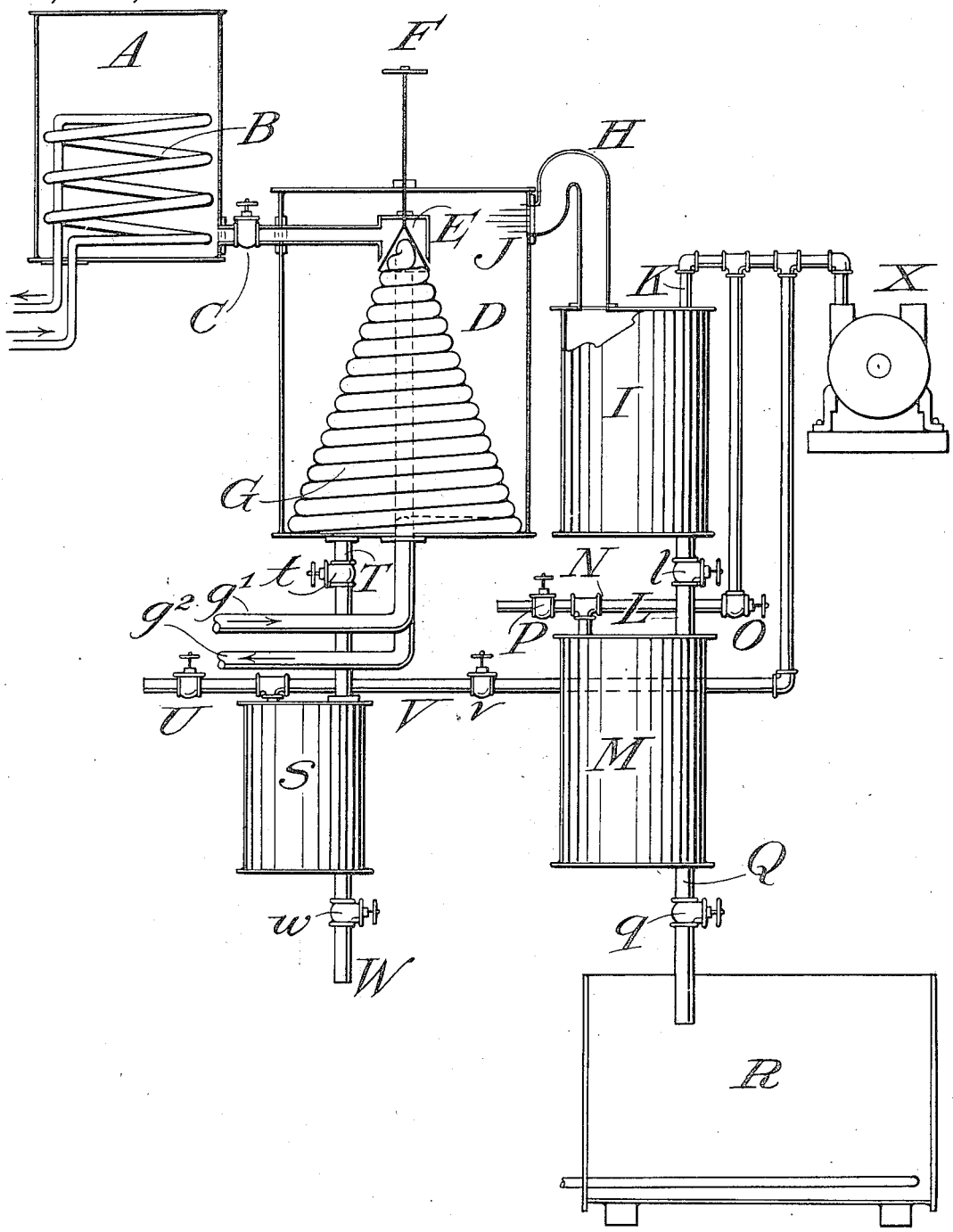

UNITED STATES PATENT OFFICE.

MARION GILBERT DONK, OF WASHINGTON, DISTRICT OF COLUMBIA.

PROCESS FOR PRODUCING HIGH-GRADE ROSIN FROM LOW-GRADE ROSIN.

1,219,413. Specification of Letters Patent. Patented Mar. 13, 1917.

Application filed April 1, 1915. Serial No. 18,594.

(DEDICATED TO THE PUBLIC.)

*To all whom it may concern:*

Be it known that I, MARION GILBERT DONK, a citizen of the United States, and an employee of the Department of Agriculture of the United States of America, residing in the city of Washington, District of Columbia, (whose post-office address is Washington, District of Columbia,) have invented a new and useful Process for Producing High-Grade Rosin from Low-Grade Rosin.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

The object of my invention is to provide a simple and practical process for treating low grade rosin so as to obtain from such product a high grade, clear rosin of light amber color. In the trade classification of rosin, said product is divided into a number of grades, depending primarily on color, clearness and transparency. These grades are represented in ascending order by letters ranging alphabetically from "A" to "N" (with the omission of the letters "J" and "L"), and "WG" and "WW," respectively. The lowest or "A" grade, known as common or black rosin, is practically black and opaque. The rise in quality through the various grades is marked by increasing transparency and lighter color to where, in the higher grades, the rosin is comparatively clear and of a light amber color, and its commercial value for its various uses in the arts is correspondingly increased.

Numerous efforts have been made to convert the low, into high grade rosin. The known methods for improving the quality of low grade rosin depend in a general way on the treatment of the rosin with substances producing a bleaching effect and partake, for that reason, of the nature of chemical processes. Because of the great expense, such methods of treatment, have, however, not been used on a commercial scale.

I have discovered that by distillation *in vacuo*, the colophony or rosin proper may be separated from the substances which cause the dark color and opacity in low grade rosin, thereby obtaining from said low grade rosin a rosin equal or superior in color and clearness to the higher grades of rosin, without otherwise changing the chemical and physical properties of the product. This is owing to the fact, which I discovered, that the coloring of low grade rosin is due to the admixture of a very small proportion of dark coloring matter with the colorless or almost colorless constituents of the colophony or the rosin proper. And further, that such material is not volatile at the temperature corresponding to the low pressure at which the distillation is conducted in my process, while the said mentioned constituents of the rosin proper are volatilized and thereby separated from the contaminating matter so as to render the rosin thus treated clear and of a light amber color.

In a high or perfect vacuum the rosin distils unchanged except for separation of the foreign matter left behind in the distilling vessel. The combined distillate, when it has hardened by cooling, possessing, except for its clearness and lighter color, the properties of the original rosin. Distilled in a partial vacuum, however, rosin is subject to more or less decomposition. The extent of this decomposition depends on the temperature, which, in turn, depends upon the pressure under which the distillation is conducted. If the pressure does not exceed 100 mm. the decomposition is but slight and at said pressure the combined distillate sets on cooling to a soft mass that is also clear and of a light amber color. This product may be separated into a hard, clear, light colored resin and a clear, light colored oil by fractional condensation during the distillation, if desired.

In carrying out my process the rosin to be treated is transferred *en masse* or as a liquid spray to a suitable distilling apparatus fitted with non-entraining still-head and eduction pipe suitably connected with a receiver, which receiver also communicates through suitable connections with a vacuum pump and a second receiver. The still and receivers should preferably be provided with vacuum gages, so that the pressure within the apparatus may be registered and read.

In the accompanying drawing I have illustrated a diagrammatic view of the preferred form of apparatus which I employ in practising my process. Referring to the drawing, A represents a tank provided with heating coils, B, for pre-heating and melting down the crude rosin. A valve, C, controls the admission of the hot melted rosin into the still, D, by means of the distributing valve, E, which, in turn, is controlled by the valve stem, F. The still, D, is provided with a closely spaced, conically disposed heating coil, G, and has communication with the closed receiver, I. The entrance of eduction pipe, H, is guarded with suitably disposed metallic bristles or needles, J, which are designed for preventing the rosin particles from being mechanically carried over into the receiver, I, by frothing. The bubbles produced when such frothing occurs are punctured by the sharply pointed bristles or needles, J, and collapse if the foam rises so as to come in contact with said bristles or needles. Breaking of the bubbles in this way prevents the impurities which it is desired to eliminate from being carried over into the receiver, I. The accomplishment of this purpose may be further assured by supplementing suitably disposed baffles at the entrance of the induction pipe, H, for providing additional means to guard against the entrainment of such impurities. The pipe, K, connects receiver, I, with a vacuum pump, X, and by means of pipe, L, it is connected with a second closed receiver, M. Pipe L is provided with a valve, $l$, for controlling the discharge from receiver I into receiver M. Receiver M is provided, at its top, with a pipe, N, for connecting said receiver with the vacuum pump, X. This pipe, N, is provided with a valve, O, for controlling the opening of said receiver, M, to the vacuum pump, X, and is also provided with a second valve, P, for opening said receiver, M, to the atmosphere. Receiver M communicates with the vat, R, through the pipe, Q, which is provided with a valve, $q$, for controlling the discharge from said receiver into said vat.

A closed tank communicates with the still, D, through the pipe, T, which is provided with a valve, $t$, for controlling the discharge into tank, S, of the residuum accumulating in the still, D. Tank S is connected to the vacuum pump, X, by means of the pipe, V, which is provided with a valve, $v$, for controlling the opening of said pipe, and said pipe, V, is also provided with a valve, U, for opening the tank, S, to the atmosphere. The discharge from the tank, S, passes through the pipe, W, and is controlled by means of the valve, $w$.

Superheated steam, high flash mineral oil or other such fluid, maintained at the desired temperature in a suitable furnace, is circulated through coils, G and B, to hold the still, D, and the tank, A, at the proper temperature.

In carrying out my process, I place the rosin to be treated in tank, A, where it is heated to the melting point by circulating superheated steam or hot oil through coil, B, from any convenient source. The vacuum pump, X, is then started for producing a vacuum in the still, D, and receiver, I. By means of the vacuum pump, X, I reduce the pressure in said apparatus from atmospheric to 100 mm. or as near a perfect vacuum as it is desired to maintain the pressure for producing the products herein described and claimed on an economic and commercial scale. While the vacuum is being established, I heat the still, D, to the temperature necessary for the rosin to distil, at the low pressure thus established in the still, by circulating superheated steam or oil, heated to the temperature desired, through the coils, G, which is supplied to said coil from any convenient source through the supply pipe, $g'$. Superheated steam or oil passes from the coils, G, through the outlet pipe, $g^2$. The valves E and C are then adjusted so as to permit the melted rosin to flow from the tank, A, in a thin film over the conically disposed heating coils, G. In running downward over the hot surface of the coils, G, the melted rosin is heated to a temperature whereby, due to the vacuum maintained in said still it is volatilized or made to distil, which distillation causes the light colored constituents in the dark rosin to separate from the impurities present in the crude rosin. These light colored constituents so vaporized pass from the distilling vessel, D, into the receiver, I, and their separation from the dark impurities, remaining as a residuum in the still, is thereby effected.

The flow of melted rosin into the still, D, is regulated so as effectually to separate the light constituents from the dark product in the crude rosin, and the inflow is further regulated so as to permit the distillation to proceed at about the rate of influx of the crude melted rosin.

The rosin vapors passing into the receiver, I, through the induction pipe, H, are condensed or liquefied in said receiver, I, and distillate is run from said receiver in a hot, liquefied state through the pipe, L, into a second receiver, M, from which it may be discharged through the pipe, Q, into a suitable receptacle or container, R, where it may be stirred or mixed to render it of uniform composition and permitted to cool. The cooling process operates to solidify the liquefied distillate to a hard mass of clear rosin that is of a light amber color and ready for the trade. This finished product or refined rosin is adaptable for use for the various purposes to which the highest grade rosin is put.

To make the process a continuous one, the liquefied distillate, which collects in receiver, I, as also the dark residuum which accumulates in the still, D, must be withdrawn at suitable intervals without destroying or impairing the vacuum in the apparatus. The removal of the distilled rosin from the receiver, I, is accomplished by closing the valves, P and $q$, and opening the valve, O, in order that a vacuum in the receiver, M, may be established. The pressure in receiver M is thus lowered by means of the vacuum pump, X, to equal the pressure in receiver, I, and when the pressure is so lowered, the valve, $l$, is opened. Upon opening the valve, $l$, the contents of receiver I is discharged through the pipe, L, into receiver M. When this discharge is effected, the valves $l$ and O are closed and the valve P opened, thereby establishing atmospheric pressure in said receiver M. By opening the valve $q$, the rosin thereupon runs from the receiver M, through the pipe Q, into the mixing vat, R.

To remove the dark residuum at suitable intervals from the still, D, a vacuum is drawn into the tank, S, by opening the valve $v$, and applying the vacuum pump X. When pressure in tank S has been lowered by means of the vacuum pump, X, to equal the pressure in the still, D, the valve, $t$, is opened, thereby permitting the dark residuum which is accumulated in the still, D, to run through the pipe, T, into the tank, S. When the discharge is completed, the valves $t$ and $v$ are closed, and the valves U and $w$ opened. The residuum in tank S then runs through the pipe, W, into a suitable container. This residuum is allowed to cool and harden, whereupon it may be devoted to the commercial purpose to which it is adapted.

Having thus described my invention, I claim:

1. A process for producing a high grade rosin from low grade rosin, consisting in transferring low grade rosin to a still provided with an outlet guarded with projections for preventing frothing of the heated rosin, and then establishing a vacuum in said still, heating the product to the point of distillation at a temperature at which there shall be no material destructive distillation thereby separating from the dark colored bodies in the low grade material the light amber colored components present therein, transferring the distillate to a container and condensing it, withdrawing the condensed liquefied distillate and allowing the product to cool until hardened, substantially as specified.

2. A process for producing high grade rosin oil from low grade rosin, consisting in placing the low grade rosin in a still and reducing the vacuum in said still from atmospheric to partial vacuum not exceeding 100 mm. and then heating the product to the point of distillation for separating from the dark colored bodies in the low grade material the light amber colored components present therein, and then separating by fractional condensation the light colored rosin components in the distillate, substantially as specified.

In testimony whereof, I affix my signature in the presence of two subscribing witnesses.

MARION GILBERT DONK.

Witnesses:
CHARLES W. BOYLE,
THOMAS SHAW.